US006307961B1

(12) United States Patent
Balonon-Rosen et al.

(10) Patent No.: US 6,307,961 B1
(45) Date of Patent: Oct. 23, 2001

(54) USER-INTERACTIVE CORRECTIVE TUNING OF COLOR PROFILES

(75) Inventors: Mitchell R. Balonon-Rosen, Cambridge; Jay E. Thornton, Watertown, both of MA (US)

(73) Assignee: PGI Graphics Imaging LLC, Tarrytown, NY (US)

( * ) Notice: Subject to any disclaimer, the term of this patent is extended or adjusted under 35 U.S.C. 154(b) by 0 days.

(21) Appl. No.: 08/903,620

(22) Filed: Jul. 31, 1997

(51) Int. Cl.[7] ........................ G06K 9/00
(52) U.S. Cl. ........................ 382/167; 358/518; 345/153
(58) Field of Search ........................ 382/167, 162; 358/504, 518, 515–523, 501, 1.9; 345/431, 150–155, 88, 83; 702/85

(56) References Cited

U.S. PATENT DOCUMENTS 5,416,613 * 5/1995 Rolleston ........................ 358/518
5,438,649 * 8/1995 Ruetz ........................ 358/1.9
5,508,826 * 4/1996 Lloyd et awl. ........................ 358/501
5,612,902 * 3/1997 Stokes ........................ 702/85
5,646,752 * 7/1997 Kohler et al. ........................ 358/520
6,037,950 * 3/2000 Meir et al. ........................ 345/431
6,075,888 * 6/2000 Schwartz ........................ 382/167

OTHER PUBLICATIONS

ICC Profile Format Specification, Version 3.3; Nov. 11, 1996.
Meir et al.; U.S. Patent Application No. 08/844,380; filed Apr. 18, 1997.

* cited by examiner

*Primary Examiner*—Leo Boudreau
*Assistant Examiner*—Ishrat Sherali
(74) *Attorney, Agent, or Firm*—Brian L. Michaelis; Joseph P. Quinn; Brown, Rudnick, Freed & Gesmer

(57) ABSTRACT

Local color correction to color values which result from processing of images within a Color Management System (CMS) is implemented by adjusting existing fields and tags within a color profile. A source image is rendered on a source digital imaging device, and the same or a different image is manipulated by the CMS then rendered on a destination digital imaging device. The CMS uses predetermined color profiles associated with the source and destination devices. The technique is useful when the manipulated image rendered on the destination device has a number of color regions which the user determines are unacceptably different in appearance from the source rendered image. Depending upon the embodiment being practiced, either spectrophotometric or colorimetric measurements or onscreen identifications are made of the respective error regions within the two rendered images and the user is enabled to indicate preferred color matching results. Based upon these measurements and user input, the original profiles are modified to improve the CMS quality performance as judged by the user.

18 Claims, 2 Drawing Sheets

FIRST IMAGE RENDERING DEVICE
GENERATE COLOR MATCH
SECOND IMAGE RENDERING DEVICE
FIRST IMAGE
USE COLOR PROFILE TO RENDER SECOND IMAGE
SECOND IMAGE
IDENTIFY SUB-OPTIMAL RENDERING OF COLOR
SPECIFY PREFERRED COLOR RENDERING
ADJUST FIELDS AND TAGS OF PROFILE USING A PROPOGATION REGION

USER-INTERACTIVE CORRECTIVE TUNING OF COLOR PROFILES

BACKGROUND OF THE INVENTION

All image rendering devices impose distortions on the color characteristics of an image. Thus, the matching of color appearance between images and documents transferred among any combination of digital image rendering devices such as monitors, scanners, and printers requires the imposition of specialized color image processing knowledgeable about the color rendering characteristics of the different imaging devices. Generalized open systems for applying such color processing are known as Color Management Systems (CMS) and are proliferating in the arena of desktop computing. These systems depend upon standard data structures known as color profiles (hereinafter "profiles") to determine how to process image pixels. Due to a large number of factors, a CMS in combination with available profiles may deliver colors not all of which a user would consider optimal for a color appearance match. In the current CMS arena when a combination of profiles are found to produce very acceptable matches for most colors but have a limited number of known deficits, there are practically no useful tools available to even the most knowledgeable user and none at all to the naive user for making fine adjustments to the system results.

Color Management Systems are necessary because different imaging devices have different color capabilities, describe color characteristics in different terms, and operate in different color spaces. For example, a color display monitor in a computer system may operate in RGB color space by creating and describing colors in terms of red, green and blue (RGB) values. The RGB values associated with particular colors for the display monitor are device-dependent in that the RGB values associated with specific colors are particular for the given monitor. Since the RGB values are device-dependent, colors displayed on different monitors will probably not be visually identical even for the same RGB input values.

Most printers create and describe colors in device-dependent terms differing from those used by monitors. Printers typically use cyan, magenta, yellow and black (CMYK) values to describe colors, and are said to operate in the CMYK color space. Since the CMYK values are device-dependent, colors printed on any given printer will probably not match colors printed on a different printer for the same CMYK values.

Further complicating color matching between devices is the fact that different devices have different color capabilities. Every rendering device, such as a printer or monitor, has a limited range of colors, i.e. gamut, that it can reproduce. Those skilled in the art will recognize that color display monitors tend to be able to produce a wider range of lighter colors whereas color printers tend to be able to produce a wider range of darker colors. Consequently, the gamut for a color display monitor is different from the gamut for a color printer. As a result, some colors displayed on monitors cannot be reproduced on color printers and vice versa.

Parameterized color transform models are used by a CMS to translate between devices with the goal of maintaining color appearance. For example, suppose that the user displays an image on a monitor. If he prints the image without any color correction, the color appearance of the printed image will differ significantly from that of the original. Using a color transformation model with parameters which take into account the idiosyncratic color rendering characteristics of the user's monitor and the user's printer, a CMS will ideally reduce the color appearance difference to a perceptively acceptable level. The data from which the CMS derives the parameters to the color transform model are stored in the color profiles for the two devices. For the purposes of this example, where the image displayed on the monitor is to be matched by a printed sample, the monitor is considered the source device and its associated profile the source profile; whereas, the printer is considered the destination device and its associated profile the destination profile.

The International Color Consortium (ICC) has in recent years described a standard file format for color profiles. The draft ICC Profile Format Specification, Version 3.3, Nov. 11, 1996 is incorporated herein in its entirety for supplemental background information which is non-essential but helpful in appreciating the applications of the present invention. The ICC defines five major classes of color profile: device profile, device-link profile, color space conversion profile, abstract profile and named color profile. Device profiles are further broken down into subclasses of input profiles, output profiles and display profiles. The ICC profile is a tagged file structure which includes three main sections: a header, a tag table and tagged element data. A CMS determines from the profile header general device, file and profile information such as the profile class. Among the most essential fields found in a device profile's header is the profile connection space (PCS) field which indicates which device-independent units are used within tags which are utilized by the CMS when deriving parameters for its color transform model. The tag table acts as a table of contents for the tag element data which is where the profile tags are stored. Tags fall into the categories of required, optional and private. Each profile class has a different set of required tags. The intent of requiring tags for specific profile classes is to ensure a common base level of functionality which all CMS's can perform using conforming profiles. Profiles may also contain optional tags defined by the ICC or private tags defined by others. These additional tags may be ignored by the CMS or a knowledgeable CMS can take advantage of them.

The two most relevant ICC profile classifications with respect to the present invention are the device profile and the device-link profile. A device profile's tags describe the relationship between device digits and the device-independent units of the profile's PCS. For output device profiles and CMYK input device profiles the AtoB tags are required by the ICC to describe the relationship from device digit to PCS and the BtoA tags are required for describing the inverse relationship. For other input device profiles and all display device profiles the required tags for describing color characteristics are the TRC and Colorant tags. A device-link profile contains tags which describe the relationship between the digits for a first device and the digits of a second device. The AtoB0 tag describes the relationship between source digits and destination digits as required by the ICC for device-link profiles.

In an end-user's color managed environment, device profiles are usually only exercised in pairs where one is designated as source and the other as destination. This architecture allows the CMS to process images which originate at the source device with the goal of matching the original color appearance when rendered at the destination device. Device-link profiles are used alone and already have been conditioned to describe the end-to-end relationship between a specific source and a specific destination device. An advantage which device profiles have over device-link profiles is that they can be used in series with any other device profile allowing the CMS complete flexibility to manage any configuration of profiled source and destination devices. Device-link profiles while more limited in their application are associated with computational efficiencies and quality improvements which make them more desirable to use in those CMS situations where source and destination devices are fixed and known at profile making time, such as for a proofing system.

The original profile creator, hereafter the "craftsman," may be associated with the device manufacturer, or with a third party service bureau or may be the end-user himself. Any number of commercially available software packages or the craftsman's own custom software may be used to take raw color measurements from the device(s) being characterized as well as other user input, and based upon these data populate the appropriate tags and fields in the color profile. One example of such a profile making environment is described in U.S. patent application Ser. No. 08/844,380 filed Apr. 18, 1997 by Meir et al. and is incorporated by reference in its entirety to provide supplemental background information which is not essential but is helpful in appreciating the applications of the present invention.

Specialized color measurement instruments used within these profile making environments typically include spectrophotometers or calorimeters. Spectrophotometers used for these purposes will measure from a rendered color the spectrum of energy reflected across the range of visible wavelengths. Measurements of spectra are relatively memory intensive and are usually considered extraneous. For profile making purposes spectrophotometers are usually configured to report in colorimetric units which involves convolution of measured spectra with the spectrum of a light source and then convolving with the color matching functions followed by integration and depending on the specific units needed, further mathematical manipulation. Colorimeters utilize filtered detectors to perform an analog equivalent to the previously described convolution and integration. Spectrophotometers configured to report in colorimetric units, calorimeters, and even the human eye which like the calorimeter has three filtered detectors, will not be able to distinguish between all colors which have unique spectra. Confusion of colors with different spectra, known as metamerism, will be present when an instrument or the eye reports similar response from these colors due to the loss of information which is a by-product of the integration process.

After a profile is created, it is customary for its craftsman to test its quality performance. Unless the craftsman is the end-user or is delivering the profile into a highly prespecified environment, it is unlikely that he has exactly the devices which will be used in concert with the profile, nor does he know exactly which CMS will be utilized. In the case of a device profile it is never clear exactly which other profiles will eventually be used to complete a source/destination pairing. Initial testing of a profile for system quality performance thus becomes an inexact science. The end-user when exercising the profile in a specific system configuration may encounter different results from those the craftsman encountered during his testing phase.

The original craftsman and the end-user will sometimes encounter a situation where a CMS exercising a particular device-link profile or pair of device profiles will produce an image where the majority of colors is presented with the expected quality of color matching, but a few areas of the image will be reproduced non-optimally according to the user's opinion. There are many ways in which such a problem can be introduced, a few examples include: mismatching gamuts between source and destination imaging devices, noise in characterization data, undersampling of imaging device characteristics, imaging device drift, imaging device miscalibration, color measurement instrument failure, logical mistakes in the profile making software, logical mismatches between CMS assumptions and profile making software assumptions, and physical appearance differences between source and destination media. To fix the problem users have very few tools. The more sophisticated the user is in terms of profile technology and color science the greater his capability to determine why the mismatch is occurring and perhaps by use of his low level skills manipulate data or directly edit profile tags to overcome the problem. Due to the immense number of sample points depended upon by the profile making software, the complexity of the software's algorithms and the size of the profile tags which contain the information, fixing such a localized problem through low level means can at times be extremely difficult. Users sometimes have at their disposal the means to edit images prior to presenting them to the CMS software, anticipating the problems introduced by the profiles and overcompensating to get acceptable results after applying the profile. This extra image editing step is cumbersome, expensive and a violation of the reason one has invested in a CMS in the first place as it is causing the user to become an expert color manager. CMS users would benefit from friendly, efficient tools which enable localized color corrections to a device-link profile or a to a series of device profiles. For this application, local color corrections means local with respect to a color map.

SUMMARY OF THE INVENTION

Local color correction to color values which result from processing of images within a Color Management System (CMS) is implemented by adjusting existing fields and tags within a color profile. A source image is rendered on a source digital imaging device, and the same or a different image is manipulated by the CMS then rendered on a destination digital imaging device. The CMS uses predetermined color profiles associated with the source and destination devices. The technique is useful when the manipulated image rendered on the destination device has a number of color regions which the user determines are unacceptably different in appearance from the source rendered image. Depending upon the embodiment being practiced, either spectrophotometric or colorimetric measurements or onscreen identifications are made of the respective error regions within the two rendered images and the user is enabled to indicate preferred color matching results. Based upon these measurements and user input, the original profiles are modified to improve the CMS quality performance as judged by the user.

BRIEF DESCRIPTION OF THE DRAWINGS

The aforementioned aspects and other features of the invention are described in conjunction with the digital image processing system of which.

DETAILED DESCRIPTION OF THE PREFERRED EMBODIMENTS

In accordance with the principles of the invention, local color correction to a single color value or a range of color values which result from color processing of images within a Color Management System (CMS) is implemented by adjusting existing tags within color profiles rather than performing the expensive task of completely regenerating tags from modified data. The general local color adjustment technique according to the invention is intended to improve the quality performance of a CMS where an arbitrary digital image is rendered on a source imaging device, and the same image is further manipulated by the CMS using profiles associated with the source and destination devices. The technique is useful when the manipulated image rendered on the destination device has a number of color regions which the user determines are unacceptably different in appearance from the source rendered image. Depending upon the embodiment being practiced, either spectrophotometric or colorimetric measurements or onscreen identifications are made of the respective error regions within the two rendered images and the user is enabled to indicate preferred color matching results. Based upon these measurements and user input, modified versions of the original profiles are yielded which are intended to improve the CMS quality performance as judged by the user.

Three embodiments of systems operating in accordance with the principles of the invention are described below. All of these approaches share the common goal of providing a user-friendly method for specifying which colors within an arbitrary image rendered on a source device yield a suboptimal color match when the same image is CMS processed using particular profiles and rendered on a destination device, and for providing a means for the user to guide the software to modify the profiles such that the match will be improved. The embodiments differ in the means through which the profile tuning software becomes informed of the errant colors and these differences impact the resultant corrections. Embodiment 1 calls for the user to indicate spots in images displayed on a monitor through use of a computer mouse and supporting software. In Embodiment 2 the user measures spots on printed images with a multi-filter color measurement instrument such as a spectrophotometer. Embodiment 3 requires the use of a 3 channel color measurement instrument such as a colorimeter for indicating the image points. Each of the embodiments is further broken down into several variations, each variation differing with respect to which class of profiles are being tuned. Variation A corrects a device-link profile, Variation B corrects a source/destination pair of device profiles and Variation C encounters the source/destination pair of Variation B and creates a single, corrected device-link profile.

Figure 1:
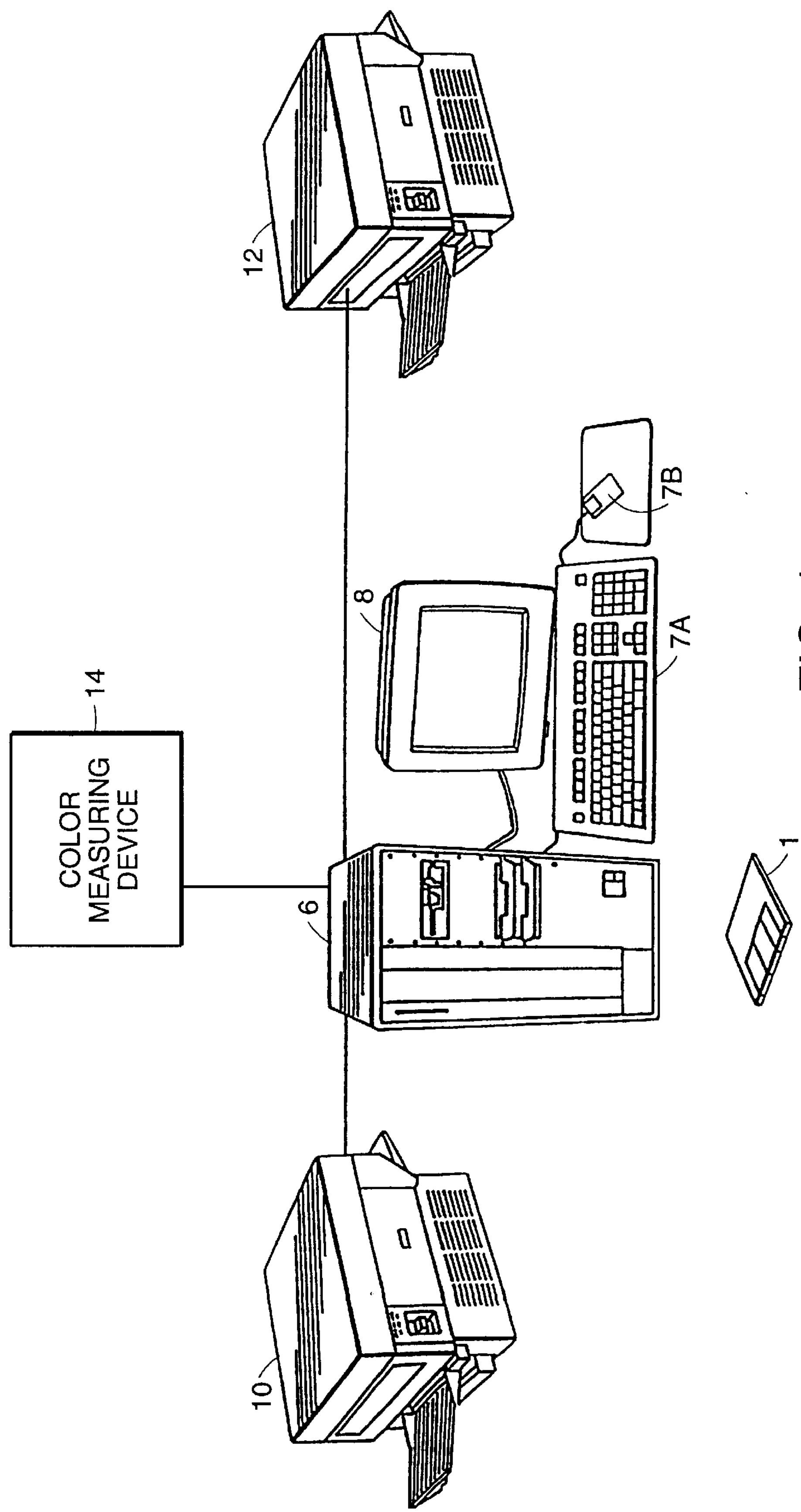
FIG. 1 is a pictorial view of at least one embodiment of the invention.
Figure 2:
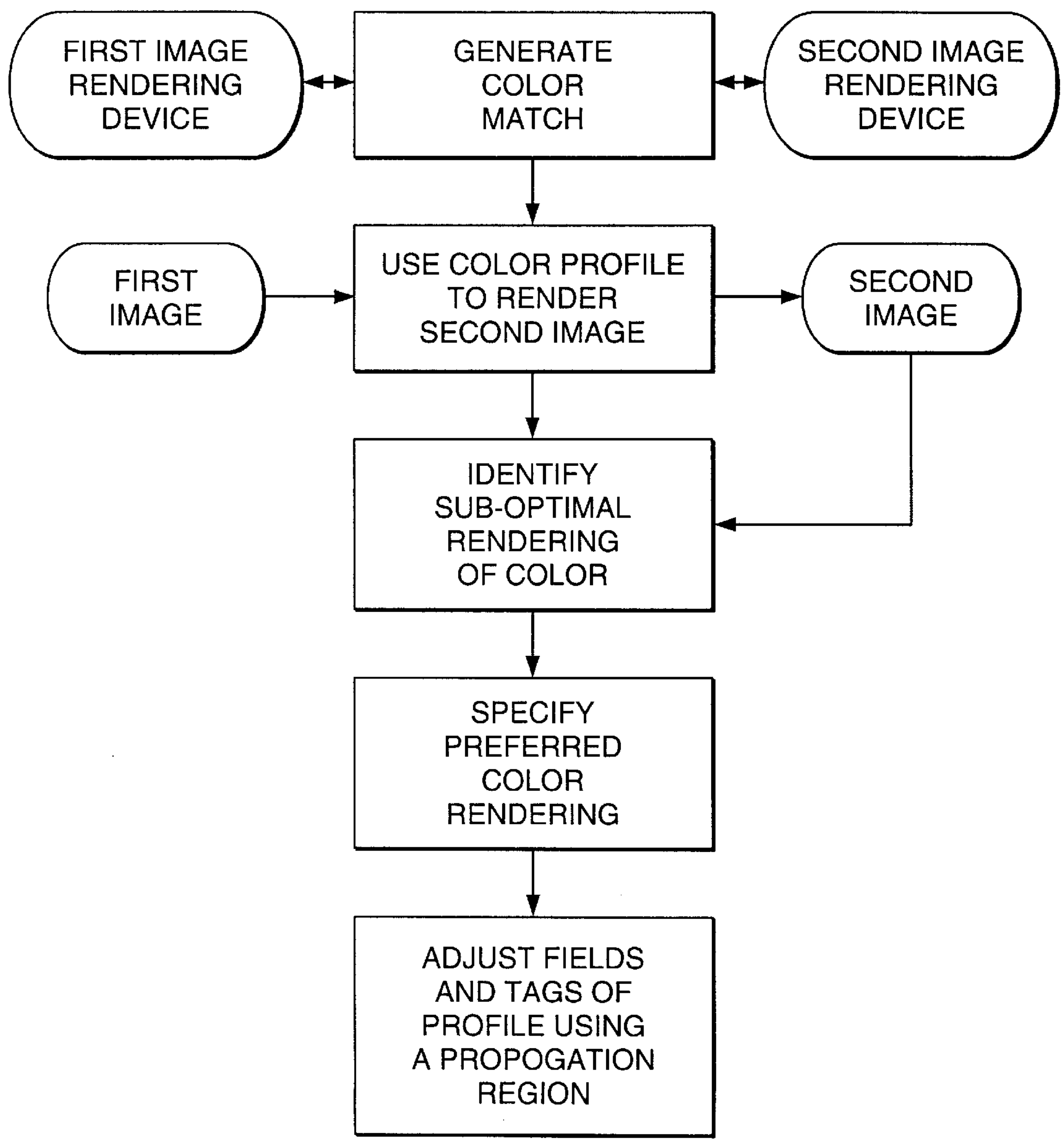
FIG. 2 is a process flow diagram according to at least one embodiment of the invention.

In a first embodiment, Embodiment 1A, a device-link profile is exercised by a CMS resident on a desktop computing system. The user renders a digital image on a source device and then processes that image through the CMS and renders it on the destination device. FIG. 1 illustrates an example of such a computing environment which includes a printer 12, a proofing device 10 and a computer 6 with a monitor 8, a keyboard 7A and a mouse 7B. The computer also contains I/O ports for reading and writing to a CDROM or floppy disk 1. This system is but one example of the many combinations of elements which could be put together to form a system for implementing the corrective tuning technique in accordance with the principles of the invention. For this example, the printer 12 will be considered the source device and the proofing device 10 will be considered the destination device. The device-link profile thus describes a mapping from digits delivered to the printer to those delivered to the proofing device.

In this first embodiment, the user will inspect the two rendered images and determine where the management of the colors could have been improved. The profile tuning software which practices the principles of the invention will perform a rendering of the image to the monitor 8. The user will indicate through use of the computer mouse 7B those spots on the image which were problematic. For each spot indicated, the user will be queried as to how better to manage those spots, specified either in units of destination digits or in device-independent values. The user will further be queried as to how large an area in source digit units should be affected by the modification. When the user requests a new profile based upon the corrections, the software will modify the AtoB0 tag in the device-link profile by updating fields which are associated with mappings from the source digits which fall within the user specified areas surrounding each indicated spot.

For this example, the user has identified a spot on the source rendered image which the software determines is $CMYK^S_1$ in source device digit units. Further, this same spot on the destination rendered image contains $CMYK^D_1$ in destination device digit units. The user has specified that $CMYK^D_2$ would be a preferable result from the CMS and that all transformations from combinations of the source digits $C^S_1 \pm \Delta c$, $M^S_1 \pm \Delta m$, $Y^S_1 \pm \Delta y$ and $K^S_1 \pm \Delta k$ should get similar treatment. A modification algorithm might entail going through the profile's AtoB0 tag, for all fields determining if the field is associated with source digits which fall within the above defined source CMYK propagation region, if so, applying to the field the operation of adding to the destination results in the field the difference between $CMYK^D_2$ and $CMYK^D_1$.

A variation of this first embodiment, Embodiment 1B, is similar in all respects to the situation described in Embodiment 1A except the CMS is exercising Profile 1 as the source device profile and Profile 2 as the destination device profile, instead of a single device-link profile. The color tuning software could be designed to modify either Profile 1 or Profile 2, yielding different results. For the problem where the specific combination $CMYK^S_1$ is rendered incorrectly, then modification of Profile 1 will be appropriate. In the alternative case where not only $CMYK_1$ is rendered incorrectly but also each $CMYK^S$ combination which makes a metameric match to $CMYK^S_1$ is similarly rendered incorrectly, then modification of Profile 2 would be best. This example is the former case, where Profile 1, the source profile, is modified. In this case, a modification algorithm might include the following: convert $CMYK^D_1$ and $CMYK^D_2$ to the source profile's PCS yielding $PCS^S_1$ and $PCS^S_2$; for each field in Profile l's AtoB tags determine if the field falls within the source CMYK propagation region as defined by $C^S_1 \pm \Delta c$, $M^S_1 \pm \Delta m$, $Y^S_1 \pm \Delta y$ and $K^S_1 \pm \Delta k$; if so, apply to the field the operation of adding to the destination results in the field the difference between $PCS^S_2$ and $PCS_1$.

A third variation of this embodiment, Embodiment 1C, is utilized for correcting a source/destination device profile pair as in Embodiment 1B. Whereas the previous embodiment variation would have produced a modified version of Profile 1, Embodiment 1C yields a new device-link profile which delivers results similar to the original source/destination pair for non-modified regions of source digit space and yields modified values where appropriate. An algorithm for building the new device-link profile's AtoB0 tag might work as follows: for all fields in the profile's AtoB0 tag take the field's associated $CMYK^S_N$ and determine the $CMYK^D_N$ which would be appropriate to deliver given Profile 1 as source and Profile 2 as destination; determine if $CMYK^S_N$ falls within the source CMYK propagation region as defined by $C^S_1 \pm \Delta c$, $M^S_1 \pm \Delta m$, $Y^S_1 \pm \Delta y$ and $K^S_1 \pm \Delta k$; if so, apply to the field the operation of adding to $CMYK^D_N$ the difference between $CMYK^D_2$ and $CMYK^D_1$; otherwise, populate the field with $CMYK^D_N$.

Embodiment 2A shares a similar scenario with Embodiment 1A where a device-link profile is to be correctively tuned and where the device-link profile describes the relationship from device digits for the printer 12 to device digits for the proofing device 10. Unlike the previous embodiment, this embodiment does not utilize the computer monitor as the method for determining where in the source rendered image color problems are present. Instead, this example utilizes a novel approach where a spectrophotometer, color measurement instrument 14, becomes the tool for determining the source digits.

The spectrophotometer configuration in this embodiment, 2A, is unusual for a color management regime since the actual spectra will be captured and used instead of the standard manipulation of the spectra into calorimetric units. This approach depends upon capturing and storing an additional characterization, one which is new to color management, which describes the relationship between source device digits and reflected spectra as measured by the spectrophotometer. This new data set might be stored as a private tag in the device-link profile or could be kept as a separate document. Formation of this data set might work as follows: a plethora of color patches with known CMYK's is printed on the source system; spectrophotometric measurements of these samples are made; analysis yields the 4 wavelengths which correlate most significantly with the digital specification of source CMYK; a lookup table (LUT) is formed by use of this information which is indexed by the percent reflectance of the identified wavelengths as reported by the spectrophotometer and which yields associated source CMYK values. For this example this LUT with its new class of information is then stored as a private tag in the device-link profile.

As in the Embodiment 1 scenarios, the user for Embodiment 2A will inspect an arbitrary digital image rendered on a source device and compare it with the same image further processed though the CMS and then rendered on the destination device. The user will determine where the management of the colors could have been improved and for this embodiment will measure with a spectrophotometer spots on the images which are indicative of these errors. As in the Embodiment 1 examples, the user will be queried as to how better to manage each spot, specified either in units of destination digits or in device-independent values. The user will further be queried as to how large an area in source digit units should be affected by the modification. When the user requests a new profile based upon the corrections, the software will modify the AtoB0 tag in the device-link profile by updating fields which are associated with mappings from the source digits which fall within the user specified areas surrounding each indicated spot.

For this example, the user has measured with the spectrophotometer a spot on the source rendered image, the software determines through the above described LUT that this spot is $CMYK^S_1$ in source device digit units. The software is also able to determine through the profile that the same spot on the destination rendered image contains $CMYK^D_1$ in destination device digit units. The user has specified through an interface that $CMYK^D_2$ would be a preferable result from the CMS and that all transformations from combinations of the source digits $C^S_1 \pm \Delta c$, $M^S_1 \pm \Delta m$, $Y^S_1 \pm \Delta y$ and $K^S_1 \pm \Delta k$ should get similar treatment. A modification algorithm might entail going through the profile's AtoB0 tag for all fields determining if each field is associated with source digits which fall within the above defined source CMYK propagation region, if so, applying to the field the operation of adding to the destination results in the field the difference between $CMYK^D_2$ and $CMYK^D_1$.

Embodiments 2B and 2C could be further described as variations on Embodiment 2A in exactly the same way that Embodiments 1B and 1C vary from Embodiment 1A. Embodiment 2B corrects device profiles instead of Embodiment 2A's device-link profile. Embodiment 2C creates a device-link profile which embodies the adjustments. As Embodiment 2A was distinguished from 1A through the use of a spectrophotometer instead of a computer monitor and supporting software, Embodiments 2B and 2C are similarly distinguished from Embodiments 1B and 1C.

Embodiment 3A corrects a device-link profile like Embodiments 1A and 2A, but uses as its color measurement instrument 14 a three channel device such as a colorimeter. For a four color system such as a CMYK printer, such a three channel device does not have the capability to distinguish between instrumentally metameric CMYK combinations. As in previous examples, the device-link profile describes the relationship from the printer 12 and the proofing device 10. This approach is further dependent upon knowing the relationship between source digit values and device-independent color as well the relationship between device-independent color and destination digit values. For purposes of this example, the mapping between source device digits and device-independent colors will be referred to as Mapping 1 and the mapping between device-independent colors and destination digit values will be referred to as Mapping 2. These transforms are incidental to the original profile making procedure and could be stored as tags within the profile or within a separate document or documents available to the software.

In this embodiment, the user has measured with a colorimeter a spot on the source rendered image, data from the colorimeter coming in device-independent units which for the purpose of this example are units of $L^*a^*b^*_{ab}$, thus the identified spot yields the value $L^*a^*b^{*S}_1$. The user also measures the same spatially located spot on the destination rendered image, yielding $L^*a^*b^{*D}_1$. The software determines through Mapping 2 that the spot on the destination rendered image contains $CMYK^D_1$, in destination device digit units. The user specifies through an interface that $CMYK^D_2$ is a preferable result from the CMS and that all transformations from combinations of source CMYK digits which through Mapping 1 are associated with $L^{*S}_1 \pm \Delta L^*$, $a^{*S}_1 \pm \Delta a^*$, and $b^{*S}_1 \pm \Delta b^*$ should get similar treatment. A modification algorithm might entail going through the profile's AtoB0 tag, for all fields converting the field's associated source digits to $L^*a^*b^*_N$ through Mapping 1, determining if $L^*a^*b^*_N$ falls within the above defined source $L^*a^*b^*$ propagation region, and if so, applying to the field the operation of adding to the destination results in the field the difference between $CMYK^D_2$ and $CMYK^D_1$.

Embodiment 3B is similar in all respects to the situation described in Embodiment 3A except the CMS is exercising Profile 1 as the source device profile and Profile 2 as the destination device profile instead of a single device-link profile. The color tuning software is designed to modify either Profile 1 or Profile 2, here the results are the same either way, but it is more efficient to modify Profile 2. For this case, a modification algorithm might include the following: convert $CMYK^D_1$ and $CMYK^D_2$ to the destination profile's PCS yielding $PCS^D_1$ and $PCS^D_2$; for each field in Profile 2's BtoA tags determine if the field falls within the source $L^*a^*b^*$ as defined by $L^{*S}_1 \pm \Delta L^*$, $a^{*S}_1 \pm \Delta a^*$, and $b^{*S}_1 \pm \Delta b^*$; if so, apply to the field the operation of adding to the destination results in the field the difference between $CMYK^D_2$ and $CMYK^D_1$.

In the above embodiments, local regions of color space in which adjustments are to be propagated were specified in units most convenient for the simplified examples. There are, in fact, numerous ways in which correction regions might be elicited from users with interfaces which work in either device-dependent or device-independent terms. Additionally, for simplicity sake, the magnitude of adjustments were constant within these propagation regions. Other implementations could employ formulas for attenuating the modifications as colors approach the borders of defined regions.

It is to be understood that the above described embodiments are merely illustrative of the present invention and represent a limited number of the possible specific embodiments that can provide applications of the principles of the invention. Numerous and varied other arrangements may be readily devised in accordance with these principles by those skilled in the art without departing from the spirit and scope of the invention as claimed.

What is claimed is:

1. A user-interactive method for adjusting fields and tags modifying the color transformation performance of a color profile in an imaging for use in a digital image processing system which includes first and second imaging devices, the method comprising the steps of:

generating a color match between at least one color in a second image rendered by the second image device and said at least one color in rendering a first image rendered by the first imaging device;

utilizing the color profile to render a second image on the second imaging device;

identifying at least one color associated with suboptimal rendering in the second image;

specifying a preferred color rendering for each identified color; and adjusting ones of fields and tags of the color profile to accommodate said preferred color processing, wherein said adjusting step comprises utilizing a propagation region in order to limit how far and to what extent the modifications are manifested in color space within the color profile tags and fields.

2. The method of claim 1, wherein said color profile is selected from the group consisting of: a device profile; a device-link profile; a color space conversion profile; an abstract profile; a named color profile; an input profile; an output profile; and a display profile.

3. The method of claim 1, wherein the first and second images are identical.

4. A color profile editing method comprising the steps of:

measuring, from an image, color data to be adjusted;

adjusting said measured color data;

specifying colors in an image for which the color profile produces suboptimal results;

specifying how such results would be modified;

deriving a transform which describes the modifications in a form acceptable for storage within a color profile; and editing said color profile by replacing existing color tag information with said modifications, wherein said editing step comprises utilizing a propagation region in order to limit how far and to what extent the modifications are manifested in color space within the color profile tags and fields.

5. The method of claim 4, wherein said color profile is selected from the group consisting of: a device profile; a device-link profile; a color space conversion profile; an abstract profile; a named color profile; an input profile; an output profile; and a display.

6. The method of claim 4, wherein said step of specifying colors in an image comprises using a measuring device selected from the group consisting of: a multichannel measurement instrument; a colorimeter; a spectrophotometer; and a densitometer.

7. The method of claim 4, wherein said step of specifying how such results should be modified comprises measuring a preferred color and deriving the digital values which would render such a color.

8. A profile editing system for modifying the color transformation performance of a color profile for use in a digital image processing system having first rendering means for rendering a first image and second rendering means for rendering a second image through use of a profile, said profile editing system comprising:

means for identifying at least one color associated with suboptimal rendering in the second image;

means for specifying a preferred color rendering for each identified color; and means for adjusting ones of fields and tags of the color profile to accommodate said preferred color processing, wherein said adjusting means comprises utilizing a propagation region in order to limit how far and to what extent the modification is manifested in color space within the color profile tags and fields.

9. The profile editing system of claim 8, wherein said means for identifying at least one color associated with suboptimal rendering comprises means for measuring said at least one color from the first image or second image.

10. The profile editing system of claim 9, wherein said means for measuring is selected from the group consisting of: a multichannel color measurement instrument; a colorimeter; a spectrophotometer; and a densitometer.

11. The profile editing system of claim 8, wherein said means for specifying a preferred color rendering comprises means for measuring a color.

12. The profile editing system of claim 8, wherein said color profile is selected from the group consisting of: a device profile; a device-link profile; a color space conversion profile; an abstract profile; a named color profile; an input profile; an output profile; and a display profile.

13. The profile editing system of claim 8, wherein the adjustment means comprises determining digital values associated with the measured color.

14. The profile editing system of claim 8, wherein the first and second images are identical.

15. A system for modifying the color transformation of a color profile comprising:

means for rendering a first image on a first source rendering device;

means for processing an image through a color management system that accesses the color profile;

means for rendering on a second destination rendering device the color processed image;

means for selecting a third rendering of the second image as being preferably rendered; and means for adjusting ones of fields and tags of the color profile to facilitate the third rendering through the destination imaging device, wherein the adjusting means comprises utilizing a propagation region in order to limit how far and to what extent the modifications are manifested in color space within the color profile tags and fields.

16. The system of claim 15, wherein said color profile is selected from the group consisting of: a device profile; a device-link profile; a color space conversion profile; an abstract profile; a named color profile; an input profile; an output profile; and a display profile.

17. The system of claim 15, wherein the first and second images are identical.

18. The profile editing system of claim 8, wherein said means for identifying at least one color associated with suboptimal rendering comprises means for measuring said at least one color from the first image or second image.

* * * * *